(12) United States Patent
Munter et al.

(10) Patent No.: US 9,361,009 B2
(45) Date of Patent: Jun. 7, 2016

(54) METHODS AND SYSTEMS FOR SETTING PARAMETER VALUES VIA RADIAL INPUT GESTURES

(75) Inventors: Aaron Munter, San Francisco, CA (US); Philip McKay, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 451 days.

(21) Appl. No.: 12/957,953

(22) Filed: Dec. 1, 2010

(65) Prior Publication Data

US 2012/0144345 A1 Jun. 7, 2012

(51) Int. Cl.
*G06F 3/01* (2006.01)
*G06F 3/0484* (2013.01)
*G06F 3/0488* (2013.01)

(52) U.S. Cl.
CPC ........ *G06F 3/04847* (2013.01); *G06F 3/04883* (2013.01)

(58) Field of Classification Search
CPC .................. G06F 3/04847; G06F 3/04883
USPC .......................................................... 715/863
See application file for complete search history.

(56) References Cited

U.S. PATENT DOCUMENTS

| | | | | |
|---|---|---|---|---|
| 4,745,405 | A | * | 5/1988 | Himelstein et al. ............ 715/856 |
| 5,903,229 | A | * | 5/1999 | Kishi ................................ 341/20 |
| 7,046,230 | B2 | * | 5/2006 | Zadesky et al. ................ 345/156 |
| 8,259,076 | B2 | * | 9/2012 | Trent et al. ..................... 345/173 |
| 8,294,685 | B2 | * | 10/2012 | Weiss et al. .................... 345/173 |
| 8,760,417 | B2 | * | 6/2014 | Haug ............................. 345/173 |
| 8,812,992 | B2 | * | 8/2014 | Im .................................. 715/863 |

(Continued)

FOREIGN PATENT DOCUMENTS

| | | |
|---|---|---|
| EP | 1939716 | 7/2008 |
| EP | 2187300 | 5/2010 |

(Continued)

OTHER PUBLICATIONS

Moscovich et al., "Navigating Documents with the Virtual Scroll Ring," ACM, Oct. 2004, UIST '04: Proceedings of the 17th annual ACM symposium on User interface software and technology, ISBN:1-58113-957-8, doi>10.1145/1029632.1029642. pp. 57-60.*
Guimbretiere; Francois et al., "FlowMenu: Combining Command, Text, and Data Entry", 2000, ACM, UIST '00 Proceedings of the 13th annual ACM symposium on User interface software and technology, ISBN:1-58113-212-3, doi>10.1145/354401.35477. pp. 213-216.*

(Continued)

*Primary Examiner* — Steven Sax
*Assistant Examiner* — Wilson Varga
(74) *Attorney, Agent, or Firm* — Kilpatrick Townsend & Stockton LLP

(57) ABSTRACT

A computerized device can comprise a touch-enabled surface and a data processing hardware element configured by a gesture input engine to recognize an input gesture using data from the touch-enabled surface. A parameter value can be set based on determining a path traversed by the input gesture. The data processing element can comprise a processor and the gesture input engine can comprise program logic in a memory device and/or the engine may be implemented using hardware logic. Regardless, the radial input gesture can be used to set one or more parameter values without use of a direct mapping of interface coordinates to parameter values. A method can comprise tracking a plurality of input points, identifying a path defined by the plurality of input points, identifying a closed curve including the path, determining a percentage of the curve traversed by the path, and setting a parameter value based on the percentage.

14 Claims, 5 Drawing Sheets

(56) References Cited

U.S. PATENT DOCUMENTS

| | | | |
|---|---|---|---|
| 2003/0210286 A1* | 11/2003 | Gerpheide et al. | 345/863 |
| 2007/0274591 A1 | 11/2007 | Chang | |
| 2010/0156806 A1 | 6/2010 | Stallings | |
| 2010/0231536 A1* | 9/2010 | Chaudhri et al. | 345/173 |
| 2010/0251152 A1* | 9/2010 | Cho et al. | 715/765 |
| 2010/0275159 A1* | 10/2010 | Matsubara et al. | 715/810 |
| 2011/0010626 A1* | 1/2011 | Fino et al. | 715/727 |
| 2011/0083112 A1* | 4/2011 | Matsubara et al. | 715/863 |
| 2011/0109581 A1* | 5/2011 | Ozawa et al. | 345/173 |
| 2011/0175821 A1* | 7/2011 | King | 345/173 |
| 2011/0302532 A1* | 12/2011 | Missig | 715/823 |

FOREIGN PATENT DOCUMENTS

| | | |
|---|---|---|
| EP | 2306288 | 4/2011 |
| WO | 2010134275 | 11/2010 |
| WO | WO 2010134275 A1 * | 11/2010 |

OTHER PUBLICATIONS

Cogics, "Gesture Recognition," iPhone Dev SDK, Jan. 2011, retrieved from the internet at iphonedevsdk.com/forum/iphone-sdk-game-development/70670-gesture-recognition.html on Oct. 23, 2012. 3 pages.*

Smith, G.M. et al., "The Radial Scroll Tool: Scrolling Support for Stylus- or Touch-Based Document Navigation," Oct. 2004, ACM, UIST'04 Proceedings of the 17th annual ACM symposium on User interface software and technology, doi>10.1145/1029632.1029641. pp. 53-56.*

Definitions, "closed curve" and "curve": IEEE 100, The Authoritative Dictionary of IEEE Standards Terms, 7th edition, copyright 2000 by The Institute of Electrical and Electronics Engineers. ISBN 0-7381-2601-2, pp. 178 & 261.*

Search Report in Related Application GB 1120663.8 dated Mar. 26, 2012, 5 pages.

* cited by examiner

METHODS AND SYSTEMS FOR SETTING PARAMETER VALUES VIA RADIAL INPUT GESTURES

BACKGROUND

Computer applications typically allow a user to set any number of different parameter values. For example, applications allow a user to set characteristics such as font size, zoom levels, and the like. Design applications such as Adobe® Photoshop®, available from Adobe Systems Incorporated of San Jose, Calif., allow a user to select parameter values such as color, saturation, and the like. Audio applications allow a user to select parameter values such as gain or volume.

Various interface elements can be used to select parameter values. For example, a graphical user interface can include a field to enter a numeric or other value directly. As another example, the interface may allow direct selection of a desired effect (e.g., selection of a color from a color palette) or may allow selection from a list of selectable items, and/or may provide an on-screen control such as a dial, slider, or button.

SUMMARY

A computerized device can comprise a touch-enabled surface and data processing hardware. The data processing hardware is configured by a gesture input engine to recognize an input gesture based on data from the touch-enabled surface and to set a parameter value based on determining a path traversed by the input gesture. The data processing hardware can comprise a processor and the gesture input engine can comprise program logic stored in a memory device accessible by the processor. Additionally or alternatively, the gesture input engine may be implemented using logic comprising the data processing hardware. Regardless of the implementation, the radial input gesture can be used to set one or more parameter values as discussed herein without use of a direct mapping of interface coordinates to parameter values.

A method can comprise tracking a plurality of input points, such as points provided by a touch enabled input device. A path defined by the plurality of input points can be identified, and the method can further comprise identifying a closed curve including the path, determining a percentage of the curve traversed by the path, and setting a parameter value based on the percentage. For example, the parameter value may be a visual parameter setting in a design application. The path may be arbitrary and identified independent of any pre-defined mapping of interface coordinates to parameter values.

In some implementations, the closed curve may comprise a circle and the path may comprise an arc; however, the closed curve could define any other shape. If a circle is used, determining the percentage of the closed curve traversed by the path may comprise identifying a center of the circle, determining a circumference of the circle, and calculating the percentage based on a length of the arc and the circumference. Regardless of the shape of the closed curve, tracking, identifying, and setting can be carried out for a plurality of paths defined as part of a continuous gesture.

These illustrative embodiments are discussed not to limit the present subject matter, but to provide a brief introduction. Additional embodiments include computer-readable media embodying an application configured in accordance with aspects of the present subject matter to support radial input gestures and computing devices adapted to provide an application that supports radial input gestures. These and other embodiments are described below in the Detailed Description. Objects and advantages of the present subject matter can be determined upon review of the specification and/or practice of an embodiment configured in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
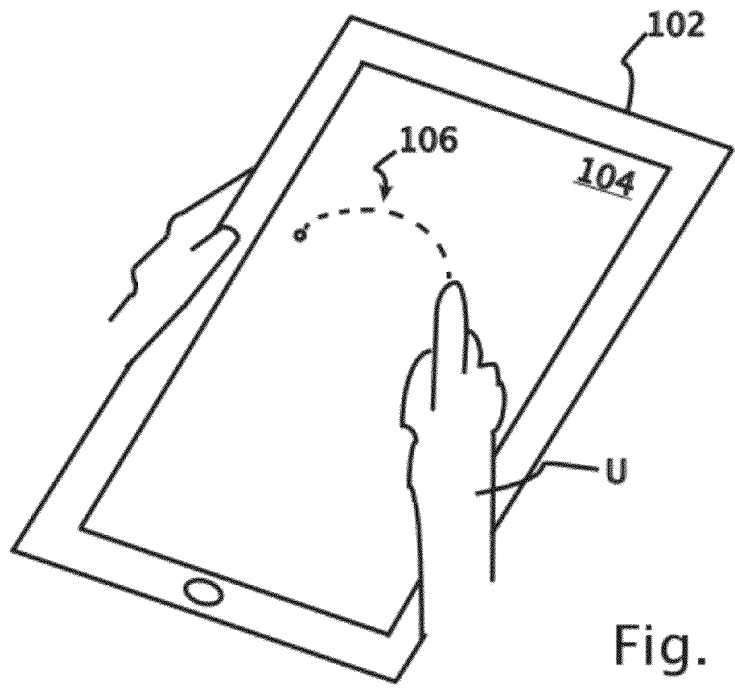
FIG. 1A is a diagram showing an illustrative use of a radial input gesture with a computing system.

Presently-disclosed embodiments include computing systems, methods, and computer-readable media embodying code. For example, a computing system can be configured to support a radial input gesture that sets one or more parameter values in an application. The radial input gesture can be represented by a plurality of points defining a path through a graphical user interface or other coordinate area.

The path may be arbitrarily—that is, the path can be defined without regard to a predefined relationship between particular coordinates and values of the parameter(s) being set by the gesture. Instead, the path itself can be analyzed to determine a closed curve that includes the path. For example, the closed curve can define an ellipse, a circle, a square, or some other shape. The parameter value can be set based on a percentage of the closed curve traversed by the path. For example, if the path covers half of the closed curve (e.g., a user traces half of a circle), then the parameter value may be set to half of its maximum value. As another example, the path may need to be traversed multiple times to reach the maximum value of the parameter.

By analyzing the length of the path as compared to the length of the closed curve, different levels of precision can be accommodated. For instance, if a user inputs a very small circle, only a short input gesture would be needed to traverse half the circle. However, if a larger radius is used, then a longer path is needed to traverse half the circle; correspondingly, more precise adjustments become possible as the radius becomes larger. The radius may be inferred from the path, may be defined with respect to an anchor point indicated by the system, or even set by a user prior to inputting the path.

The actual parameter value that is set can vary. A parameter value may be one of a series of numerical values laying in a range, and the appropriate numerical value can be selected based on the percentage of the curve traversed by the path. However, the parameter value may comprise a non-numerical parameter (e.g., file name, tool selection, etc.) indexed to a numerical value in a range mapped to the gesture. Once the numerical value is found based on the radial input gesture, the appropriate non-numerical parameter can be selected.

Use of radial input gestures may be advantageous when screen space is at a minimum, such as on mobile devices. For example, one or more sliders or other graphical user interface elements can be replaced to thereby free up screen space for design and display of content. Of course, the radial input gesture can still be used with larger screens and/or alongside sliders and other graphical user interface elements as well.

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

FIG. 1A is a diagram showing an illustrative computing device 102. As shown in FIG. 1A computing device 102 includes a touch-enabled surface 104, such as a touch-sensitive display. According to one or more aspects of the present subject matter a user U can provide a radial input gesture 106 to adjust one or more control settings of an application executed by computing device 102.

For example, in a design application such as a raster- or vector-based graphic editing application, the user may select a parameter, such as a hue, transparency, or the like, to be set and then provide the radial input gesture 106. The magnitude of the parameter can be set based on the radial input gesture. As another example, computing device 102 may recognize input of radial input gesture 106 and set a corresponding parameter value without the need for a user to first select which parameter value is to be set. As an example, the design application may be configured so that if the radial input gesture is provided, the radial input gesture is used to select one of a plurality of colors.

Figure 1B:
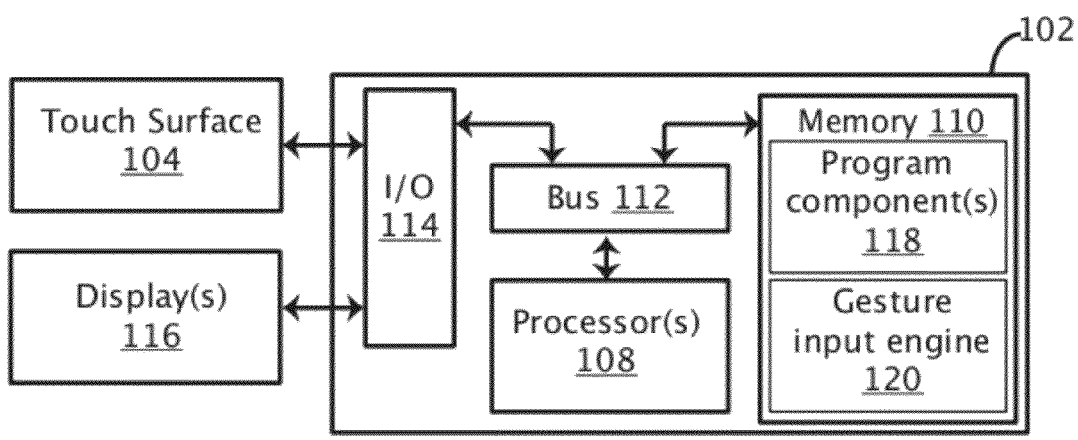
FIG. 1B is a diagram showing an illustrative hardware architecture for the computing system of FIG. 1A.

FIG. 1B is a diagram showing an example architecture for computing device 102. Computing device 102 may alternately be referred to as a data processing system, computerized device, or simply a "computer." Computing device 102 represents a desktop, laptop, tablet, or any other computing system. Other examples of computing device 102 include, but are not limited to, mobile devices (PDAs, smartphones, media players, gaming systems, etc.) and embedded systems (e.g., in vehicles, appliances, or other devices). The touch-enabled surface 104 may correspond to the display of computing device 102 and/or the touch-enabled surface 104 may be a separate input surface (e.g., trackpad, touch-sensitive mouse, etc.).

Generally speaking, computing device 102 features one or more data processing hardware elements implementing a gesture input engine 120. Gesture input engine 120 causes computing device 102 to recognize an input gesture based on data from the touch-enabled surface, determine a path traversed by the input gesture, and set a parameter value (or multiple values) based on the path. Gesture input engine 120 allows the computing device to set the parameter value(s) without the need for a mapping of particular locations to parameter values.

Gesture input engine 120 can be implemented in hardware accessible by or as part of the data processing element (e.g., as an application-specific integrated circuit, (ASIC), programmable logic device (e.g., PLAs, FPGAs, etc.)). As another example, gesture input engine 120 can be implemented using software or firmware that configures the operation of a processor or processors.

In the example shown in FIG. 1B, computing device 102 features a data processing hardware element comprising one or more processors 108 and a computer-readable medium (memory 110) interconnected via internal busses 112, connections, and the like. Bus 112 also connects to I/O components 114, such as universal serial bus (USB), VGA, HDMI, serial, and other I/O connections to other hardware of the computing system. The hardware also includes one or more displays 116. As noted above, display 116 and touch-enabled surface 104 may be the same (e.g., a touch display) or a separate touch-enabled surface 104 could be used. It will be understood that computing device 102 could include other components, such as storage devices, communications devices (e.g., Ethernet, radio components), and other I/O components such as speakers, a microphone, or the like.

Computer-readable medium 110 may comprise RAM, ROM, or other memory and in this example embodies program components 118 and the gesture input engine 120. Program component 118 represents one or more applications or processes for which a parameter value is set by input gesture 106. For example, program component 118 may comprise a design application such as Adobe® Photoshop®, Illustrator®, or Premiere Pro® available from Adobe Systems Incorporated. As another example, program component 118 may comprise some other application or an operating system. Gesture input engine 120 represents one or more components that configure computing device 102 to recognize input gesture 106 and to determine a corresponding parameter value to pass to program component 118.

In practice, program component 118 and gesture input engine 120 could be part of the same application—for instance, both program component 118 and gesture input engine 120 could be included as modules of a design or other application. As another example, gesture input engine 120 could be included in a shared library or other component used by multiple different applications and/or an operating system.

Figure 2:
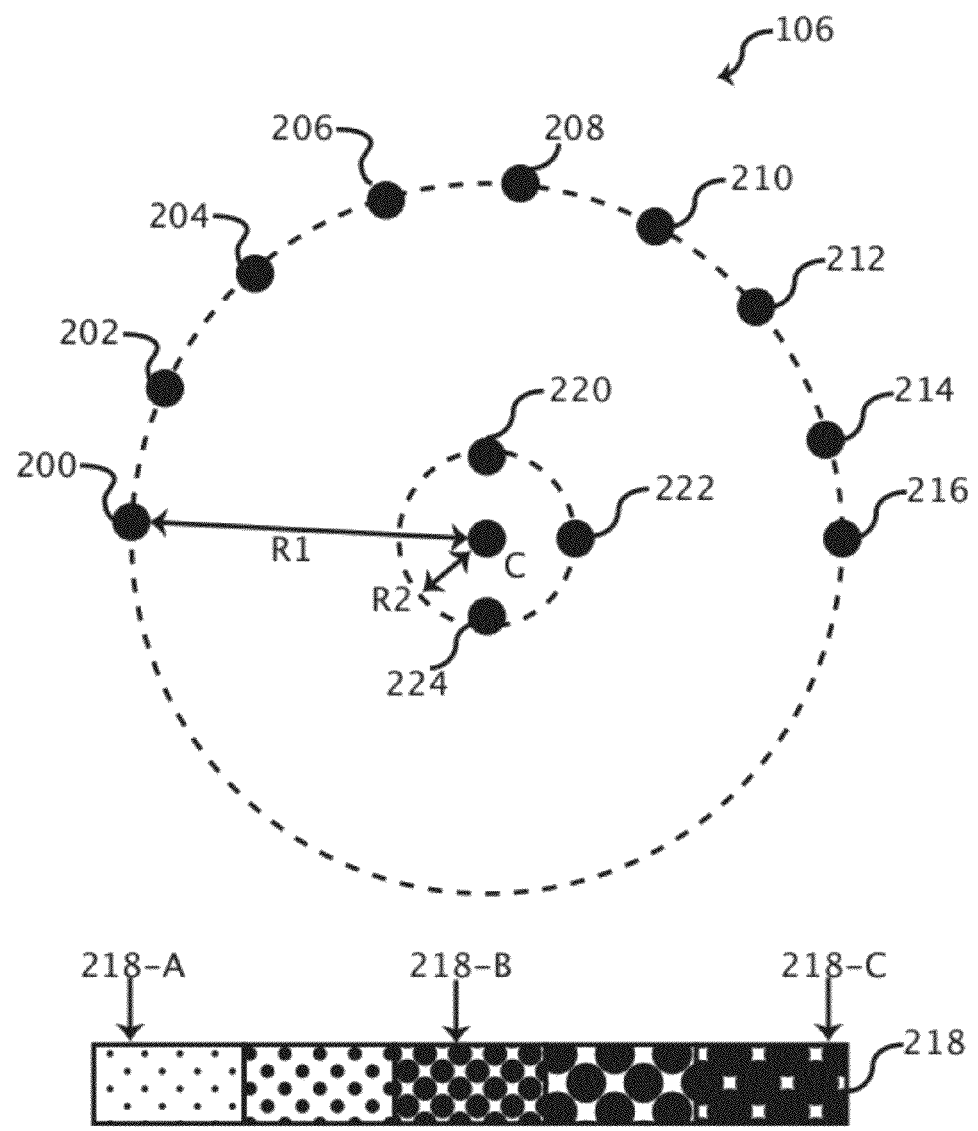
FIG. 2 is a diagram showing a plurality of points defining a path traversing one or more portions of a closed curve and corresponding parameter values.

FIG. 2 is a diagram illustrating a radial input gesture 106 that may be recognized by gesture input engine 120 in more detail. In this example, the radial input gesture is recognized by tracking a plurality of input points 200-216 that define a path. For example, a touch-enabled surface 104 may identify the input points using capacitive, optical, or other technologies. In this example, the points trace a path that is an arc about an anchor point C. As indicated by the dashed lines, the arc is part of a circle, though the closed curve could take some other shape.

FIG. 2 also shows an illustrative range 218 representing parameter values; for example, the range may represent different colors or patterns used to paint in a design application. A radial input gesture can be used to select a portion of the range or value in the range. In this example, the minimum value of the range corresponds to the lightly shaded portion and the shading increases to near-solid shading at the right side of the range. In this example, range 218 is shown alongside the gesture, but in practice the range or another indicator of the value(s) selected via the gesture may be displayed elsewhere in the display or not at all.

In this example, a user may provide gesture 106 by beginning at point 200 and tracing an arc to point 202. Because the arc lays at radius R1 from point C, the length of the arc corresponds to a relatively small portion of the circle. Thus, a value at 218-A is selected. On the other hand, if the user traces from point 200 through points 202, 204, 206, 208, 210, 212, and 214 to 216, then half of the circle has been traced. This could be mapped to a value halfway through the range, to result in selection of the color/pattern at 218-B. If the user proceeds to trace the remainder of the circle from point 216 back to point 200, then the color/pattern at 218-C (representing the maximum value of the range) can be selected.

The particular mapping of gesture length to path length can control how additional input is interpreted. For instance, if the gesture continues around again past point 200, the corresponding parameter value may reset to 218-A. As another example, gestures corresponding to parameter values outside the range may be ignored.

A second circle at radius R2 is also shown in FIG. 2. A radial input gesture along this circle uses a much smaller path length to traverse range 218. For instance, a user may begin a gesture at point 220 and move through point 222 to point 224 to traverse half the circle and result at selection of a value at point 218-B on range 218.

This example also illustrates how the particular coordinates of the starting and ending points are not, in and of themselves, controlling. For instance, no mapping of starting or ending coordinate values to values in range 218 needs to be used. Thus, traversing half the second circle from point 220 through point 222 to point 224 has the same effect as traversing half the first by from point 200 to point 216. Similarly, traversing half of the first circle from point 216 to point 200 through the bottom of the circle would also have the same effect. In this example, the circle need only be traversed once to reach the maximum value of range 218. However, some implementations can use a mapping so that the circle (or other curve) can be traced multiple times to proceed through an entire mapped range. The direction of the gesture may influence how the gesture sets parameter values—for instance, a clockwise circle may have a different effect (or even set a different value) than a counterclockwise circle. On the other hand, a mapping may be defined so that only the portion of the curve traversed by the gesture is controlling.

In some embodiments, the input path is tracked, identified, and used to set parameter values over a plurality of iterations. Effectively, the value is set for a plurality of paths as part of a continuous input gesture. For example, a plurality of arcs may be defined as part of a continuous gesture, with at least two of the plurality of arcs having a differential radial distance from the anchor point. In FIG. 2, this could occur if a user begins at point 224 and provides a clockwise input gesture along the circle at radius R2 to point 220 and then, while continuing the gesture, spirals out to the outer circle (having radius R1) to points 214 and 216

To simplify this example, the gesture is analyzed as two arcs; in practice, the spiral can, of course, be treated at a higher resolution. The initial arc (from 224 to 220) traverses half of the circle at C having radius R2; this is mapped (in this example) to the midpoint of range 218 and a value at 218-B. The second arc (from 214 to 216) allows finer adjustment; the final parameter value would result in a setting between 218-B and 218-C based on adding the parameter value derived from the second arc as an offset to the parameter value derived from the first arc. Of course, the second arc could even result in subtraction of a small amount—for example, if the gesture moved to the outer circle and then changed direction.

Figure 3C:
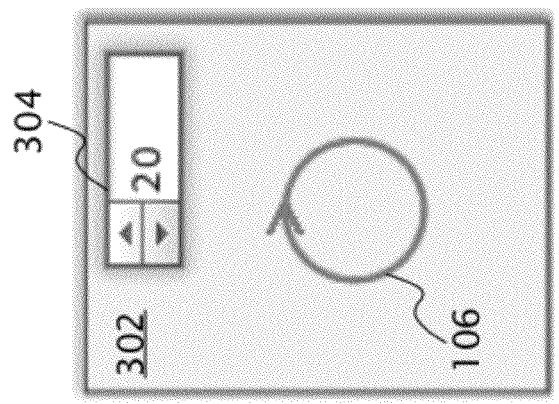
FIGS. 3A, 3B, and 3C illustrate a radial input gesture in progress.
Figure 3B:
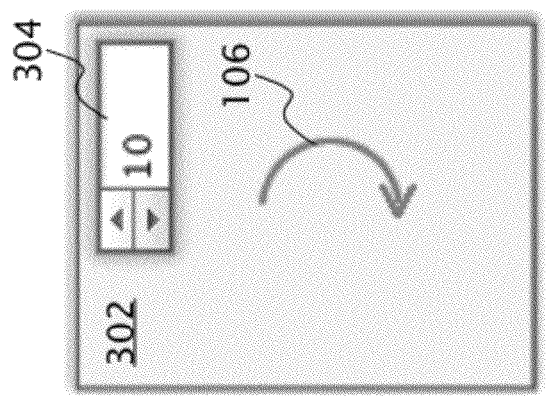
Figure 3A:
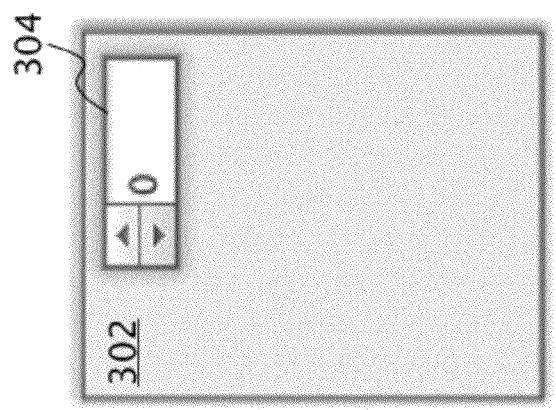

FIGS. 3A, 3B, and 3C each illustrate an example of a graphical user interface 302 showing radial input gesture 106 in progress. In this example, gesture 106 is mapped to a numerical parameter value illustrated in box 304. The parameter has a range of 0 to 20 in this example FIG. 3A shows an initial state where no gesture has been provided. Accordingly, as shown at box 304 the parameter value remains at zero. In FIG. 3B, as shown by the arrow, a radial input gesture traversing 50% of a circle has been provided. As shown at box 304, the parameter value is set at 50% of the range (to "10" in this example). In FIG. 3C, the gesture has continued to traverse 100% of the circle, resulting in a setting of the maximum value ("20") in box 304. In practice, the path may be traced in response to the input or other visual feedback (and/or audio, tactile, or other feedback) may be provided. For example, the application may dynamically update the parameter value as the gesture is provided (e.g., changing a color or other selected visual characteristic, or in this example incrementing or decrementing the value shown at box 304 as the gesture is provided). Of course, in some implementations, no feedback is provided apart from setting one or more parameter values.

The range of parameter values could extend beyond "20." For example, the mapping may be defined so that the true maximum value requires traversing the circle multiple times. For instance, if the maximum value is "60," then the circle may be traced three times to reach that value.

In some embodiments, the percentage of the path that is traversed is mapped to the range of values and the corresponding value from the range is used to set the parameter value directly. However, other methods could be used. For example, the corresponding value from the range could be used as an offset added, subtracted, or otherwise applied to an existing value for the parameter. Returning to FIG. 3A, assume that the gesture 106 as shown in FIG. 3B is provided, setting the parameter value to "10." If an offset-based method is used to set the parameter value, then after gesture 106 as shown in FIG. 3B is provided, that same gesture could be repeated to add another 10 units to the parameter value. Alternatively, a different gesture could be used to subtract units (e.g., a circle traced in the opposite direction).

Figure 4:
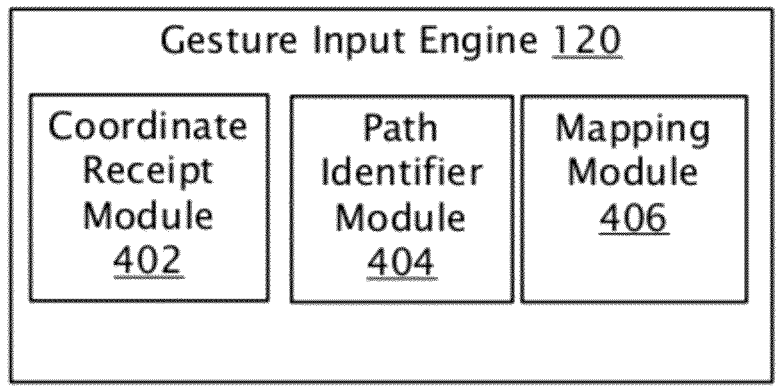
FIG. 4 is a diagram showing an illustrative software architecture for a component that recognizes radial input gestures.

FIG. 4 is a diagram showing an illustrative architecture for gesture input engine 120. Coordinate receipt module 402 represents program code or hardware logic that configures a computing system to receive input data representing a plurality of input points. For example, a driver or other component may translate signals from one or more touch input devices into screen or other coordinate values. Coordinate receipt module 402 can identify receipt of the coordinates and trigger detection of a radial input gesture.

In some embodiments, the radial input gesture is recognized based on other data. For example, a portion of a graphical user interface may be reserved for input of radial and other gestures; receipt of coordinates from the reserved area may trigger the radial input gesture recognition process. As another example, another event may trigger the radial input gesture recognition process. For instance, module 402 may recognize a command invoking the radial input gesture component 120 directly, or another input event (e.g., selection of a tool, selection of a parameter whose value is to be set) may trigger the gesture recognition process. As a particular example, selection of a paint or fill command in a design application may trigger module 402 to monitor for input coordinates.

Path identifier module 404 represents program code or hardware logic that configures the computing system to identify an arc or other path defined by the plurality of input points and to identify one or more closed curves including the arc or other path. The one or more closed curves can be determined in any suitable way. In some embodiments, the closed curve(s) are assumed to be circular and can be determined based on the arc. For example, an arc may be identified based on geometric analysis of the points—once enough points to define a differentiable curve have been identified, an arc (or potential arc) can be indicated. As another example, a graphical user interface may be mapped to include a plurality of potential curves (e.g., a plurality of concentric circles or other curves) and, based on the coordinates of the identified path, a corresponding curve can be selected for analysis.

Mapping module 406 represents program code or hardware logic that configures the processor to adjust a parameter value based on the identified path and the corresponding closed curve. For example module 406 may rely on an arc and a radial distance between the arc and an anchor point to determine the percentage of a circle traversed by the arc. As another example, the path length may be calculated based on the input points and compared to a total length of the closed curve including the path to determine a percentage of the closed curve that is traversed by the path. Based on the percentage of the curve that is traversed by the path, mapping module 406 can determine one or more corresponding parameter values. The parameter value(s) can be passed to appropriate components of an application that consumes the gesture.

As another example, if gesture component 120 is separate from the application that consumes the gesture, then mapping module 406 may not calculate the parameter values; instead, the percentage of the curve traversed by the gesture can be passed to the application that consumes the gesture for that application to apply its own mapping.

Figure 5:
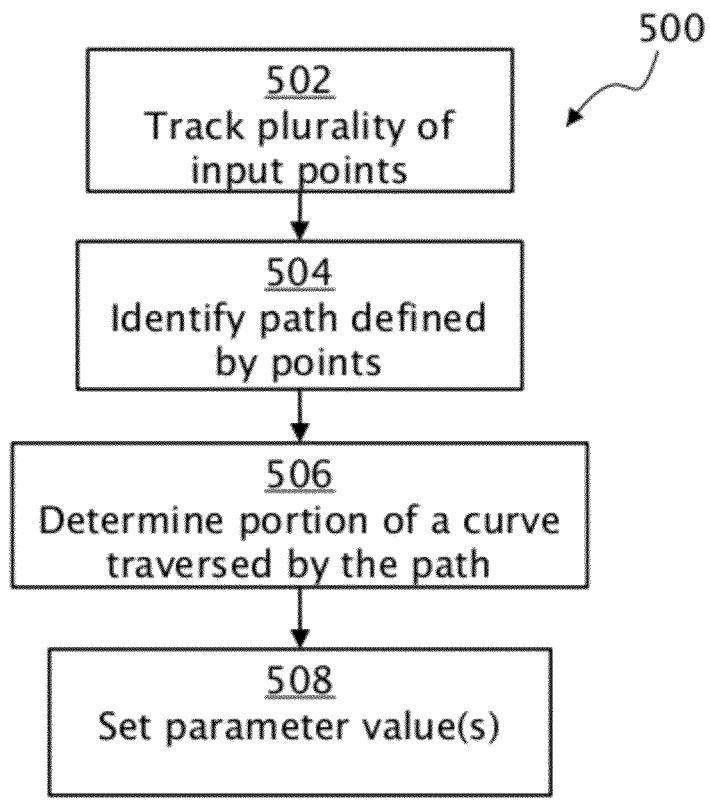
FIG. 5 is a flowchart showing illustrative steps in a method of processing a radial input gesture.

FIG. 5 is a flowchart showing illustrative steps in an exemplary processing method 500 for determining a parameter value based on a radial input gesture. For example, method 500 may be carried out during operation of computing device 102 according to gesture component 120 and other applications or components.

Block 502 represents tracking a plurality of input points. As noted above, one example of doing so is receiving input coordinate values from a touch-enabled surface 104. However, the coordinate values could be provided from another input device, such as a mouse.

Block 504 represents identifying a path defined by the plurality of input points. For instance, this can be done by determining the first available set of input points that define a differentiable curve or other recognizable path. Identifying the path may comprise applying filtering, thresholding, or other techniques to account for noise or jitter in the input coordinates.

The method may continue to update the definition in memory until a threshold time has passed during which no more input points are provided. As another example, once the minimal number of points that define the curve or other path have been identified, the method may proceed to the other steps—such an approach may be advantageous when multiple iterations of the recognition process are carried out in response to continuous input.

Block 506 represents determining the portion of a closed curve traversed by the path. The closed curve may be identified in any number of ways. For example, as noted above, the gesture recognition process may rely on data identifying a plurality of potential curves through the coordinate space and select a curve that includes the path defined by the input points. As a particular example, a series of input coordinates could be converted to radial coordinates $(r, \Theta)$ (if the coordinates are not already specified as radial components) and the curve identified from the r coordinate of the input points. As another example, a closed curve could be extrapolated from the plurality of input points by applying one or more heuristics or curve fitting algorithms. The closed curve can be displayed in a graphical user interface during the gesture, but display of the curve or path is not required.

Regardless of how the closed curve is identified, the portion of the closed curve traversed by the path can be determined. For example, a length ($L_C$) of the closed curve can be calculated, estimated, or accessed from memory. Then, the length ($L_P$) of the curve traversed by the path can be calculated based on the input points. The portion traversed by the path can be determined as $(L_P)/(L_C)$. Depending on the geometry of the path and the curve, other techniques can be used. For example, if the path is an arc, a radial distance can be determined and the portion traversed by the path can be determined in terms of a number of degrees or radians subtended by the arc as explained below in FIG. 6.

Block 508 represents setting one or more parameter values based on the portion of the curve traversed by the path. The gesture may be mapped to one parameter value or to a set of parameter values. The value(s) may be determined based on the percentage of the curve traversed by the path by calculating the value as a function of the percentage of the curve. As another example, rather than calculating the value used in setting the parameter value, data mapping percentages of the curve to the values of the parameter(s) to be set can be predefined and then accessed at block 508.

In some implementations, a parameter value is determined by selecting a value from a scale. For example, the scale may define a range of numerical values, such as values for hue, color, saturation, or some other visual parameter. As another example, the scale may comprise a numerical range indexing some other parameter of interest. For instance, a list of files, fonts, application tools/options, or some other selectable set of items may each be indexed to a value in the range.

For example, the percentage of the curve traversed by the path (i.e., $(L_P)/(L_C)$) can be multiplied with the maximum value of the parameter. The resulting product can be used directly as calculated, or may be rounded (e.g., to the nearest integer value). This approach can be used when one complete traversal of the closed curve (e.g., one complete circle) is to be correlated to an entire range of values. If multiple traversals are needed, a weight (W) can be included, such as multiplying $(L_P)/(W*(L_C))$ with the maximum value of the parameter.

The example above discussed the portion of the curve being determined as a percentage of total length. However, in some implementations, the portion of the curve may be specified in terms of radians of a circle traversed by the arc as compared in the total radians ($2\pi$) of a circle. The weight W can be used in such implementations if multiple traversals are desired to span the entire range.

The parameter value can be set directly using a value determined from the input gesture as noted above. However, in some implementations, the parameter value is set by applying the determined value to an existing parameter value. For example, the determined value can be added to or subtracted from the existing parameter value as an offset. As another example, the determined value may be applied to the existing parameter by multiplying or dividing the existing value.

Figure 6:
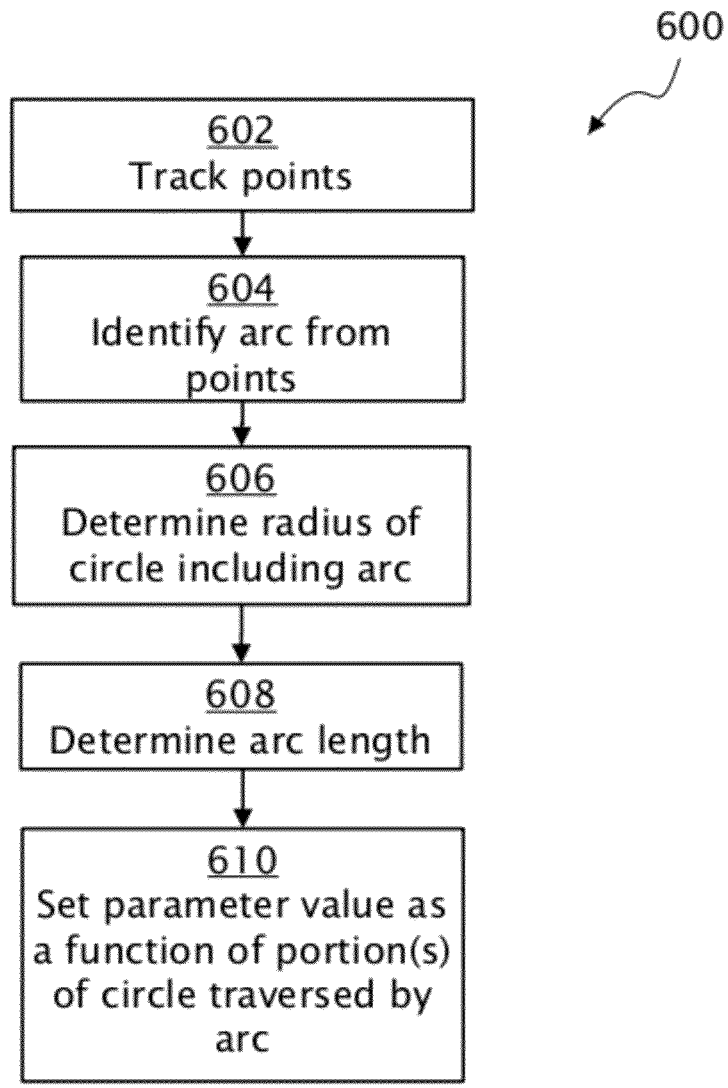
FIG. 6 is a flowchart showing an example of handling a radial input gesture specified as one or more portions of a circle.

FIG. 6 is a flowchart showing an example of a method 600 for handling a radial input gesture specified as one or more portions of a circle. Method 600 may be carried out by gesture component 120, for example.

Block 602 represents tracking input points and block 604 represents identifying an arc from the points as noted above. Block 606 represents determining the radius of a circle including the arc.

For instance, this may be performed by identifying an anchor point and determining the distance of the arc from the anchor point. In some implementations, the anchor point may be predefined. As an example, an application may be triggered to recognize a radial input gesture and provide an indicator of the anchor point in a graphical user interface. As another example, prior to input of the arc, the application may allow a user to define the anchor point (e.g., by touching a location in the graphical user interface). The radius may be discerned by identifying the closest circle to the arc traced by the user.

However, the anchor point may be discerned from the arc itself. For example, the application may assume that the arc subtends a portion of a circle and define the anchor point as the point equidistant from all points of the arc. For instance, the distance may be measured based on differences in a coordinate on the arc and a coordinate for the anchor point. As another example, the radius can be determined based on the height and width of the arc, with the width being the length of the chord defining the base of the arc and the height measured at the midpoint of the arc.

Block 608 represents determining the arc length. For example, the length of the arc may be calculated based on the coordinate values defining the arc. The arc length and radius can be used to determine a radial distance traversed by the arc. Block 610 represents setting a control parameter as a function of the portion or portions of the circle traversed by the arc. For example, as noted above, the ratio of arc length to the length of the circle (i.e., circumference) can be calculated and applied to a scale.

As another example, the and a parameter value may be set based on a mapping of radial distance to parameter values. For example, the minimum value of the scale can be mapped to an initial radial value (e.g., zero radians) and the maximum value of the scale can be mapped to a "final" radial value (e.g., $2\pi$ radians). In practice, because $2\pi$ radians and zero radians are equivalent, one or both the initial and final values can be adjusted accordingly (e.g., the scale may map the initial value to 0.000001 radians and the final value to $2\pi$ radians, or map the initial value to 0 radians and the final value to $1.999999\pi$ radians). Of course, a mapping can be defined so that an arc traverses the circle multiple times to span the entire scale—for instance, the minimum value of the scale can be mapped to zero radians, with the final value of the scale mapped to $4\pi$ ($3.999999\pi$) radians so that two loops about the circle are needed to span the entire scale.

As noted above, the parameter value that is set can correspond to any selectable item in an application. Examples include, but are not limited to, visual parameters in design applications. As another example, the parameter value may be an index value used to select a file of interest, invoke a tool or other application functionality from a selectable list, select a portion of a file (e.g., to select a certain point in video, audio, or other content indexed to a timeline), set a hardware parameter (e.g., audio gain on a device).

Several examples discussed mapping portions of the curve that were traversed to parameter values—the mapping may be from minimum to maximum, maximum to minimum, linear, exponential, or may proceed along some other function or may even be completely arbitrary. The closed curve in several examples above was a circle, but other closed curves could be used. Other geometric figures having a perimeter (e.g., squares, rectangles, triangles, other shapes) could be used as well. Additional embodiments can also include use of other figures than closed/curves and shapes, such as open curves. Generally speaking, the use of other figures could result in quick traversal of a scale because a straight line is quickest way to travel the distance between two radial points.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Although several examples featured mobile devices, the various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more non-transitory computer-readable media that embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computerized device, comprising:
a touch-enabled surface; and
a data processing hardware element,
wherein the data processing hardware element implements a gesture input engine to:
  determine a parameter value to be set based on an input command in a graphical user interface (GUI), wherein the parameter value comprises a visual parameter setting in a design application,
  receive in the GUI an identification of an anchor point that corresponds to a point equidistant from points of an arc defined by an input gesture, the input gesture defined by a starting coordinate value and an ending coordinate value and comprising a radial input gesture,
  determine a radial distance from the anchor point to the arc,
  determine a percentage of a closed curve traversed based on the length of the arc and the radial distance from the anchor point to the arc, wherein the closed curve comprises a circle, and
  set in the GUI the parameter value based at least in part on the percentage of the closed curve traversed, wherein the parameter value is set independently of a mapping of the gesture starting and ending coordinate values to parameter values,
  wherein the input gesture comprises a plurality of arcs, at least two of the plurality of arcs having different radial distances from the anchor point, and
  wherein a first arc of the at least two of the plurality of arcs has a higher radial distance to the anchor point than a second arc of the at least two of the plurality of arcs, the first arc providing a more granular control or the parameter value than the second arc.

2. The computerized device of claim 1, wherein the data processing hardware comprises a processor and the gesture input engine comprises programmable logic accessible by the processor.

3. The computerized device of claim 1, wherein the anchor point is identified from an anchor point input.

4. The computerized device of claim 1, wherein the anchor point is determined prior to recognizing the input gesture.

5. The computerized device of claim 1, wherein the input gesture comprises a first arc at a first radial distance to the anchor point and a second arc at a second radial distance to the anchor point.

6. A computer-implemented method comprising:
determining a parameter value to be set based on an input command in a graphical user interface (GUI), wherein the parameter value comprises a visual parameter setting in a design application;
receiving, in the GUI, an identification of an anchor point that corresponds to a point equidistant from points of an arc defined by an input gesture, the input gesture defined by a starting coordinate value and an ending coordinate value and comprising a radial input gesture;
determining a radial distance from the anchor point to the arc;
determining a percentage of a closed curve traversed based on the length of the arc and the radial distance from the anchor point to the arc, wherein the closed curve comprises a circle; and
setting in the GUI the parameter value based at least in part on the percentage of the closed curve traversed, wherein the parameter value is set independently of a mapping of the gesture starting and ending coordinate values to parameter values,
wherein the input gesture comprises a plurality of arcs, at least two of the plurality of arcs having different radial distances from the anchor point, and
wherein a first arc of the at least two of the plurality of arcs has a higher radial distance to the anchor point than a second arc of the at least two of the plurality of arcs, the first arc providing a more granular control for the parameter value than the second arc.

7. The method of claim 6, wherein determining the percentage of the closed curve traversed by the arc further comprises:
determining a circumference of the circle based on the radial distance from the arc to the anchor point; and
calculating the percentage based on a length of the arc and the circumference.

8. The method of claim 7, wherein the anchor point is determined prior to recognizing the input gesture.

9. The method of claim 6, further comprising:
rendering at least a portion of the arc in a graphical user interface.

10. The method of claim 6, further comprising:
rendering a selection graphic in a graphical user interface.

11. A computer program product comprising a non-transitory computer-readable medium embodying program code, the program code comprising instructions causing at least one machine to:
determine a parameter value to be set based on an input command in a graphical user interface (GUI), wherein the parameter value comprises a visual parameter setting in a design application;
receive in the GUI an identification of an anchor point that corresponds to a point equidistant from points of an arc defined by an input gesture, the input gesture defined by a starting coordinate value and an ending coordinate value and comprising a radial input gesture,
determine a radial distance from the anchor point to the arc, determine a percentage of a closed curve traversed based on the length of the arc and the radial distance from the anchor point to the arc, wherein the closed curve comprises a circle, and set in the GUI the parameter value based at least in part on the percentage of the closed curve traversed, wherein the parameter value is set independently of a mapping of the gesture starting and ending coordinate values to parameter values, wherein the input gesture comprises a plurality of arcs, at least two of the plurality of arcs having different radial distances from the anchor point, and wherein a first arc of the at least two of the plurality of arcs has a higher radial distance to the anchor point than a second arc of the at least two of the plurality of arcs, the first arc providing a more granular control or the parameter value than the second arc.

12. The computer program product of claim 11, wherein the anchor point is identified from an anchor point input.

13. The computer program product of claim 11, wherein the anchor point is determined prior to recognizing the input gesture.

14. The computer program product of claim 11, wherein the input gesture comprises a first arc at a first radial distance to the anchor point and a second arc at a second radial distance to the anchor point.

* * * * *